United States Patent [19]

Bentley

[11] Patent Number: 4,656,558
[45] Date of Patent: Apr. 7, 1987

[54] ELECTRICAL CAPACITOR
[75] Inventor: Jeffrey A. Bentley, Riverside, R.I.
[73] Assignee: Aerovox Incorporated, New Bedford, Mass.
[21] Appl. No.: 762,542
[22] Filed: Aug. 2, 1985
[51] Int. Cl.⁴ .................: H01G 4/04; H01B 3/20
[52] U.S. Cl. ...................................... 361/327; 252/574
[58] Field of Search ............... 361/314, 318, 319, 323, 361/327; 252/574

[56] References Cited

U.S. PATENT DOCUMENTS

| | | | |
|---|---|---|---|
| 2,615,955 | 10/1952 | McLean | 361/319 |
| 3,430,116 | 2/1969 | Johnstone | 361/314 |
| 3,944,895 | 3/1976 | Williams | 361/323 |
| 3,996,505 | 12/1976 | Lapp | 361/319 |

FOREIGN PATENT DOCUMENTS 991449 5/1965 United Kingdom .

OTHER PUBLICATIONS

Pilpel, "Four Synthetic Liquid Insulation-Properties and Potentials", 5/1968, 63-65.
Reynolds et al. (1972) Proc. IEE 119 (4).

Primary Examiner—L. T. Hix
Assistant Examiner—Douglas S. Lee

[57] ABSTRACT

An electrical capacitor having a rolled metallized thermoplastic strip and a liquid dielectric containing polybutene of average molecular weight of at least 800.

12 Claims, 2 Drawing Figures

ELECTRICAL CAPACITOR

BACKGROUND OF THE INVENTION

This invention relates to electrical capacitors containing one or more rolled metallized thermoplastic strips.

Such capacitors (described, e.g., in U.S. Pat. No. 3,944,895, hereby incorporated by reference) have as their electrode the metallized portion of the strip and as the dielectric spacer the thermoplastic portion of the strip. Such capacitors have been filled with a variety of liquid dielectrics including e.g., dioctylphthalate ("DOP").

SUMMARY OF THE INVENTION

In general, the invention features an electrical capacitor including a rolled metallized thermoplastic strip and a liquid dielectric containing polybutene of average molecular weight of at least 800, more preferably at least 1,000. Preferably the liquid dielectric itself has these minumum molecular weights, and preferably the high molecular weight polybutene makes up at least 50%, more preferably at least 90%, of the liquid dielectric, by volume.

In other preferred embodiments, the thermoplastic strip is of a polyolefin, most preferably polypropylene; the contact angle between the thermoplastic strip and the polybutene is at least 25°, more preferably at least 35°; and less than 10% of the molecules of the polybutene have molecular weights less than 800.

The capacitors of the invention provide long capacitor life with small losses in capacitance; are resistant to oxidation and gas evolution under electrical stress; have high resistivity and dielectric strength; and have low power factor. In addition, because of the properties of the hydrophobic, high molecular weight liquid dielectric which partially impregnates the capacitor roll, there is a high contact angle resulting in minimal wetting, penetration, and swelling of the thermoplastic strip, and loss of adhesion of the film to the metallized layer is thus avoided. Furthermore, the polybutene liquid dielectrics of the invention require little filtering, and used liquid from one cycle can be used without filtering in the next.

Other features and advantages of the invention will be apparent from the following description of the preferred embodiment thereof, and from the claims.

DESCRIPTION OF THE PREFERRED EMBODIMENT

The drawings will first be described.

Drawings

Structure and Composition

Figure 2:
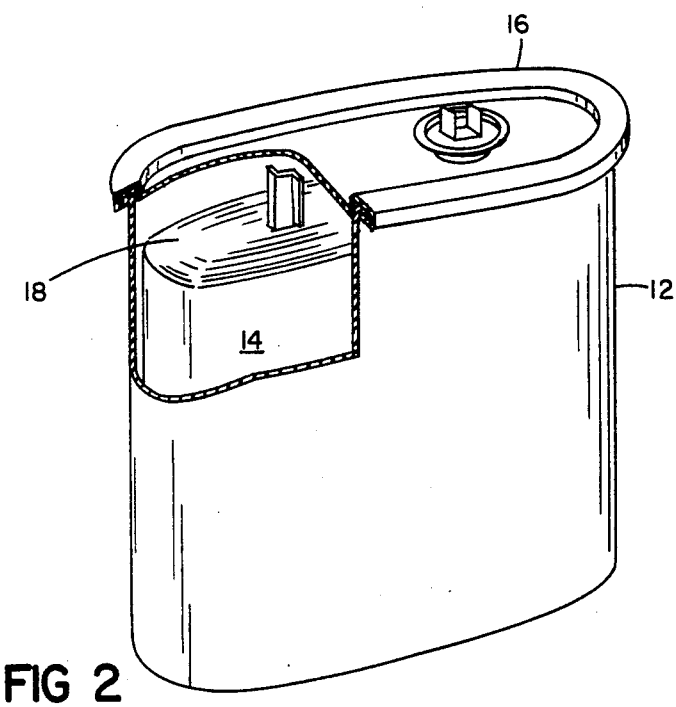
FIG. 2 is a diagrammatic illustration of a capacitor of the invention.

The structure of the solid components of the capacitor are shown in FIG. 2: can 12, roll 14, and external electrical contact 16. The roll comprises metallized thermoplastic strip 18.

The liquid dielectric is composed predominantly of a high molecular weight polybutene, e.g., H-300 polybutene, manufactured and sold by Amoco Chemicals and described in Amoco Bulletin 12-K. The following excerpts from Bulletin 12-K give some of the properties of H-300.

AMOCO Polybutenes are made by polymerizing an isobutylene-rich butene stream with a metal halide catalyst. The polymer backbone structure resembles polyisobutylene, although more 1- and 2-butenes are incorporated in the lower molecular weight fractions.

* * *

Although the thermal cleavage of the polymer backbone appears to be random, at sufficiently high temperatures the major product is isobutylene.

* * *

AMOCO Polybutenes are composed predominantly of high molecular weight mono-olefins (95–100%), the balance being isoparaffins.

The olefin structure is predominantly the trisubstituted type (R—CH=CR$_2$). Only minor amounts of vinylidene (R—CH$_2$—C—R) and terminal vinyl (R—CH=CH$_2$) structures are present.

* * *

Some internal double bonds probably exist, but these are difficult to characterize.

These isolated double bonds are relatively inert to the oxidation reactions that occur with highly unsaturated drying oils, therefore AMOCO Polybutenes are resistant to physical or chemical change caused by aging. This stability has been used to advantage in the manufacture of high quality sealants and caulks, electrical insulating fluids, etc.

Figure 1:
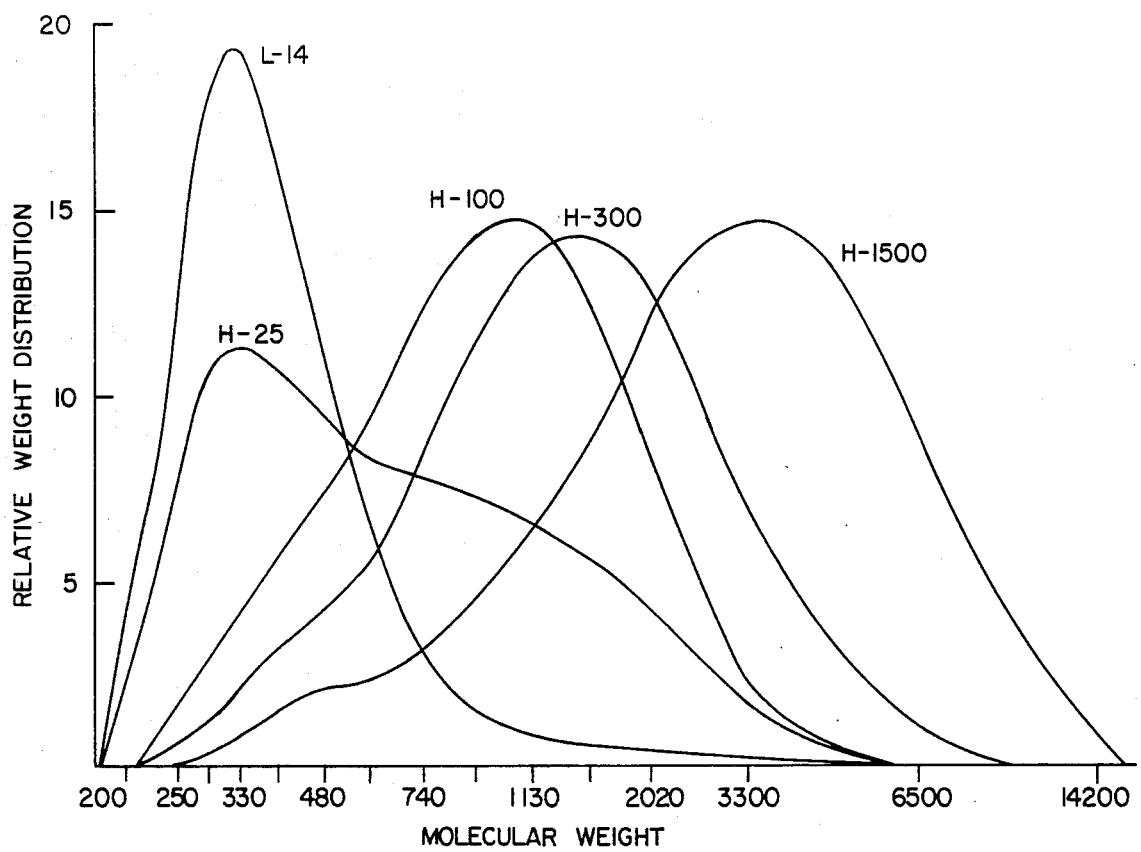
FIG. 1 is a graph showing molecular weight distributions of Amoco polybutenes.

FIG. 1 gives the molecular weight distribution of H-300 (taken from the above Amoco Bulletin); as shown therein, the largest proportion of molecules have a molecular weight of about 1,600; the average molecular weight of H-300 is about 1,290. FIG. 1 also gives molecular weight distribution of other Amoco polybutenes, which can be blended with each other or with H-300, provided that the final fluid has a low enough viscosity (generally achieved for molecular weights below about 3,000) and high enough average molecular weight. It is preferred, however, that H-300 be used by itself, so that the fluid has a narrow molecular weight distribution. The average molecular weights of the polybutenes of FIG. 1 are: L-14, 320; L-50, 420; L-100, 460; H-15, 563; H-25, 610; H-35, 660; H-50, 750; H-100, 920; H-1500, 2060; H-1900, 2300.

The preferred liquid dielectric, designated 92-22, consists of H-300 containing, by volume, 0.7% epoxide (Union Carbide ERL 4221 having the chemical name 3, 4 epoxycyclohexylmethyl 3, 4 epoxy cyclohexane carboxylate) and 0.1% antioxidant (Shell Corp. Ionol, having the chemical name 2, 6 di-tert-butyl 4-methylphenol).

Impregnation

Impregnation generally must be carried out at temperatures higher than those used for other liquids such as DOP, because high molecular weight polybutene is too viscous to flow easily at low temperatures. Apart from this requirement, impregnation using polybutene generally is carried out according to standard methods. The process is generally as follows.

The capacitors, prior to impregnation, are prebaked in a circulating air oven at 203°–221° F. for three hours.

They are next stacked terminal-down and dried under a vacuum of less than or equal to 100 microns for five hours at a temperature of 203°-221° F. Impregnation is then carried out without an intervening cooling step.

Prior to being used to impregnate the capacitors, the liquid dielectric 92-22 is heated to 203°-221° F. and filtered through a Sparkler Plate Filter containing a series of plates, each covered with filter paper, and containing predried porocel, and through a Hilco Hyflow Filter containing two paper filter cartridges. The filtered liquid is maintained in a clean storage tank at 203°-221° F. until impregnation.

The capacitors are impregnated by maintaining the vacuum in the impregnation tank while maintaining the temperature at 203°-221° F., and pumping the hot liquid dielectric into the tank. Vacuum (100 microns) is then reinstated for fifteen minutes, broken for fifteen minutes, reinstated for fifteen minutes, broken for fifteen minutes, reinstated for fifteen minutes, and then broken for fifteen minutes, after which time the tank is drained. The capacitors are then removed from the tank and immediately solder-sealed.

OTHER EMBODIMENTS

Other embodiments are within the following claims. For example, polybutenes from any source can be used; many companies, e.g., Chevron and British Petroleum, manufacture and sell polybutenes. The high molecular weight polybutene can be mixed with other liquid dielectrics, including low molecular weight liquids such as DOP, provided the resulting final liquid has an adequately high average molecular weight. Any of the standard additives used in capacitor liquid dielectrics also can be used.

I claim:

1. An electrical capacitor having as its electrode the metallized portion of a rolled metallized thermoplastic strip and having as its dielectric spacer the thermoplastic portion of said strip, said capacitor further comprising a liquid dielectric comprising polybutene of average molecular weight of at least 800.

2. The capacitor of claim 1 wherein said thermoplastic film comprises a polyolefin.

3. The capacitor of claim 2 wherein said polyolefin is polypropylene.

4. The capacitor of claim 1 wherein said polybutene comprises at least 50%, by volume, of said liquid dielectric.

5. The capacitor of claim 1 wherein said average molecular weight is at least 1,000.

6. The capacitor of claim 1 wherein less than 10% the molecules of said polybutene have molecular weights less than 800.

7. The capacitor of claim 1 wherein the average molecular weight of said liquid dielectric is at least 800.

8. The capacitor of claim 7 wherein the average molecular weight of said liquid dielectric is at least 1,000.

9. The capacitor of claim 8 wherein the average molecular weight of said liquid dielectric is at least 1,200.

10. The capacitor of claim 1 wherein the contact angle between said liquid dielectric and said thermoplastic strip is at least 25°.

11. The capacitor of claim 10 wherein said contact angle is at least 35°.

12. The capacitor of claim 1 wherein said polybutene has an average molecular weight of at least 1,200.

* * * * *